United States Patent [19]

McComber

[11] 4,218,932

[45] Aug. 26, 1980

[54] BELT SPROCKET WHEEL

[75] Inventor: Donald R. McComber, Littleton, Colo.

[73] Assignee: The Gates Rubber Company, Denver, Colo.

[21] Appl. No.: 792,158

[22] Filed: Apr. 29, 1977

Related U.S. Application Data

[63] Continuation of Ser. No. 641,105, Dec. 15, 1975, abandoned.

[51] Int. Cl.³ .................. F16H 55/30; B62D 55/08
[52] U.S. Cl. .................... 474/161; 180/9.62; 305/35 EB; 305/57; 474/164; 474/153; 474/92
[58] Field of Search .......... 74/243 R, 243 C, 243 NC, 74/229, 450, 437, 434, 431; 305/21, 35 EB, 57; 180/9.62

[56] References Cited

U.S. PATENT DOCUMENTS

| | | | |
|---|---|---|---|
| 1,922,357 | 8/1933 | Divney et al. | 305/57 |
| 1,953,362 | 4/1934 | Murtaugh | 74/243 C |
| 2,753,980 | 7/1956 | Ballard | 74/243 R |
| 3,472,563 | 10/1969 | Irgens | 305/13 |
| 3,486,574 | 12/1969 | Baron | 180/9.62 |
| 3,558,818 | 1/1976 | Dellnev | 74/243 C |
| 3,583,250 | 8/1971 | Komelka | 74/226 |
| 3,696,685 | 10/1972 | Lampredi | 74/230.3 |
| 3,724,285 | 4/1973 | Lapeyre | 74/243 FC |
| 3,765,258 | 10/1973 | Jesperson | 74/243 R |
| 3,870,379 | 3/1975 | Payne | 305/35 EB |

FOREIGN PATENT DOCUMENTS 461015   4/1975   U.S.S.R. ............................. 305/21

Primary Examiner—Samuel Scott
Assistant Examiner—Daniel O'Connor
Attorney, Agent, or Firm—H. W. Oberg, Jr.; Raymond Fink; Curtis H. Castlemen, Jr.

[57] ABSTRACT

A sprocket wheel with a generally equilateral polygonal rim and a plurality of spaced axially aligned teeth extending from at least one side of the rim.

10 Claims, 6 Drawing Figures

U.S. Patent
Aug. 26, 1980
4,218,932
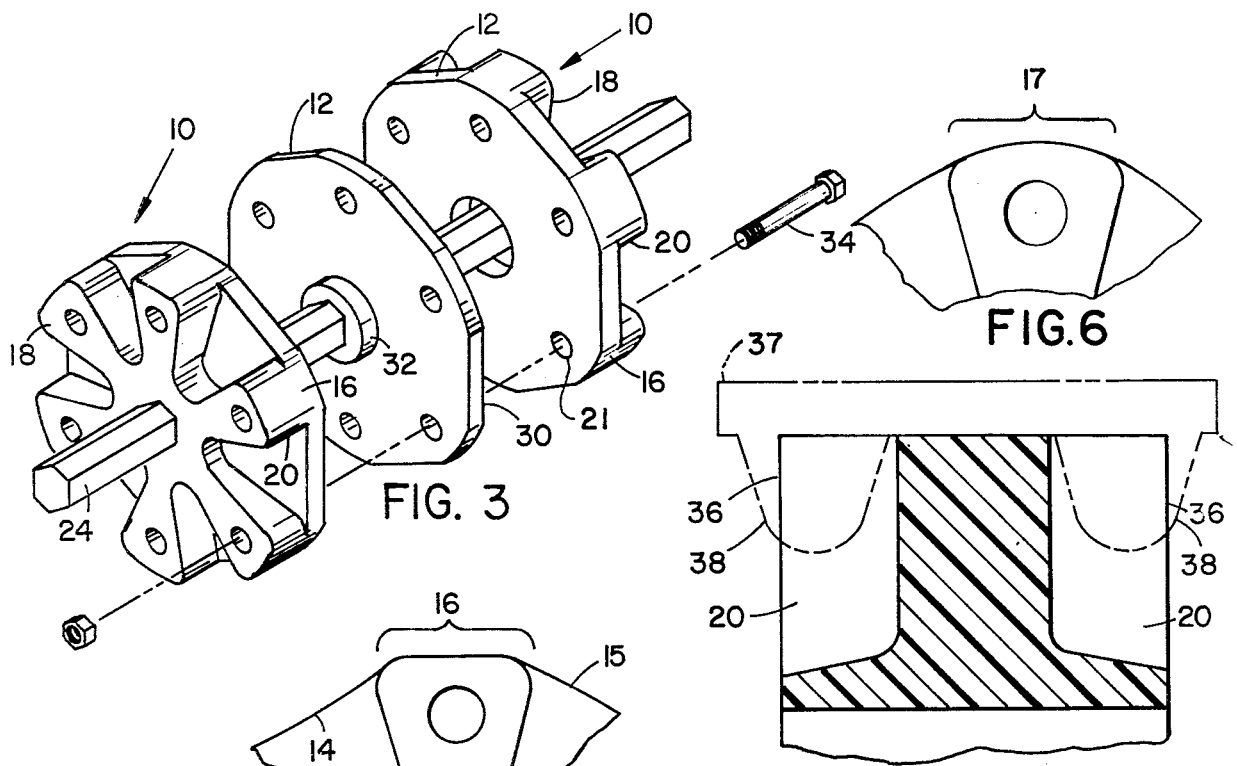
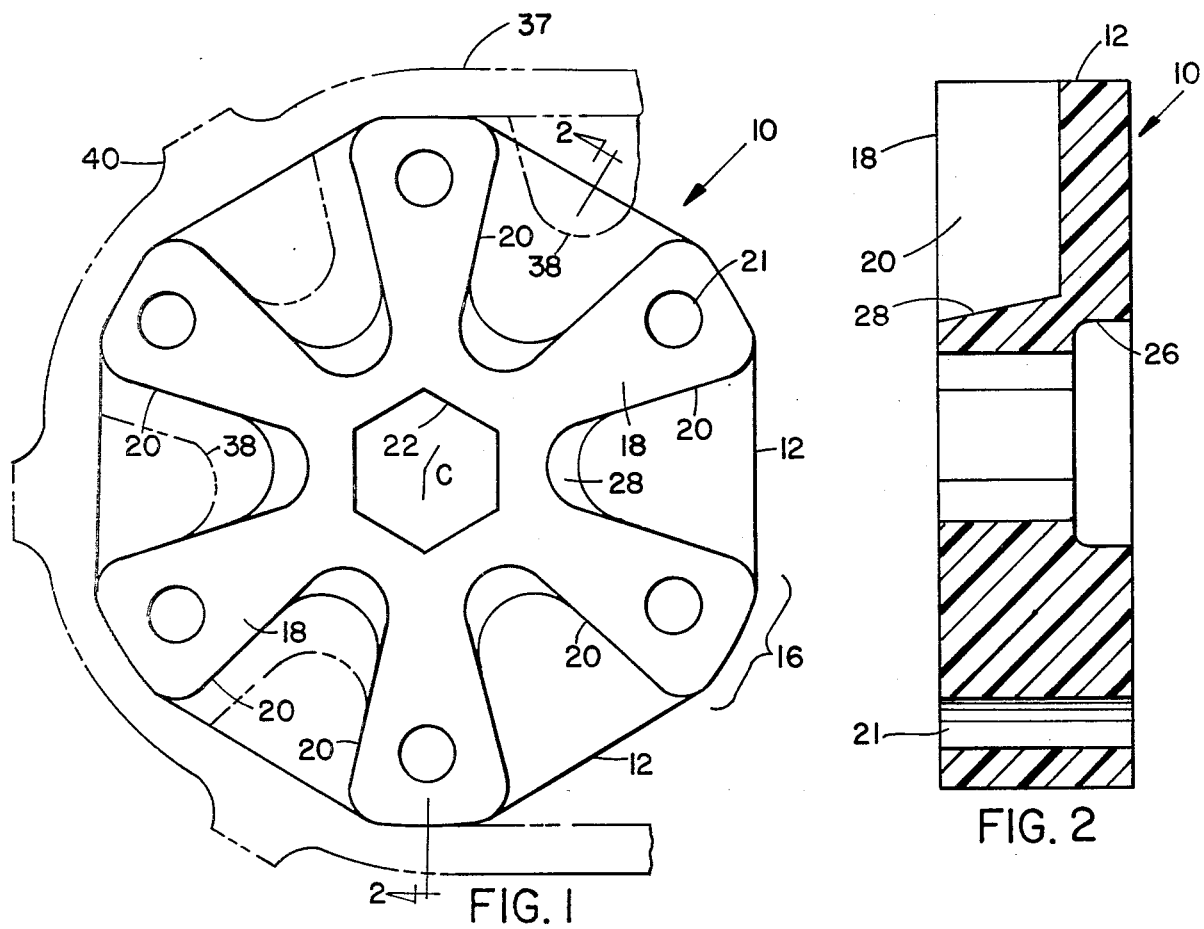

BELT SPROCKET WHEEL

This is a continuation of application Ser. No. 641,105, filed Dec. 15, 1975, now abandoned.

BACKGROUND OF THE INVENTION

The invention relates to power drives for machine elements, but more particularly, the invention relates to toothed sprockets for transmitting power to toothed power transmission belts. The sprocket is particularly directed for use in a fouling environment such as encountered with conveyor belts, harvesting equipment or snowmobile tracks.

Sprocket wheels are used to transmit power to various types of toothed belts. In special applications, the sprocket wheels are used to transmit power in fouling environments such as induced by foliage, snow, dirt, or the like. This invention is directed to such sprockets. For example, sprockets are used to transmit power to crop gathering belts as disclosed in U.S. Pat. No. 3,853,016 or snowmobile belts such as disclosed in U.S. Pat. Nos. 3,472,563; 3,575,474; and 3,756,668; or power transmission belts as disclosed in U.S. Pat. No. 3,888,132. This invention is directed primarily for powering such types of belts.

While sprockets of the type referenced are suitable for their power transmission and anti-fouling characteristics, they introduce stress problems in the belts which could cause shorter service life because of cracking; and such sprockets induce hysteresis into the belt which results in a power transmission loss. Also, integrally molded elastomeric sprockets may typically require integrally molded reinforcements at their hubs for high torque applications.

An object of the invention is to provide a sprocket which does not introduce hysteresis for those type belts with large integrally molded driving teeth.

Another object of the invention is to provide a sprocket which may be used as two replaceable halves with an optional reinforcement interpositioned therebetween for high torque applications.

Another object of the invention is to provide a anti-fouling sprocket for guiding and powering toothed power transmission belts.

The primary advantage is that longer belt lives result from the use of the sprocket of the invention than was formally realized with prior art sprockets.

These and other objects or advantages of the invention will be apparent after reviewing the drawings and description thereof wherein:

FIG. 1 is a front axial view of a sprocket of the invention;

FIG. 2 is a view taken along the line 2-C-2 of FIG. 1;

FIG. 3 is an exploded isometric view showing two oppositely facing sprockets of the invention in combination with a reinforcement and a rotatable shaft;

FIG. 4 is a partial cross sectional view similar to FIG. 2 but showing an alternate form of the invention;

FIG. 5 is a partial view similar to FIG. 1 but showing an alternate form of the invention; and FIG. 6 is a partial view similar to FIG. 5 showing an alternate form of the invention.

DESCRIPTION OF PREFERRED EMBODIMENTS

Referring to the Figures, a preferred embodiment is disclosed. A sprocket wheel 10 is provided which has a generally equilateral polygonal shaped rim with substantially equilateral sides 12. Preferably, the equilateral sides are generally straight but they may be slightly concave 14 or convex 15 (FIG. 5) provided that there is sufficient rim to define a surface to react against the sides of belt teeth.

The equilateral sides 12 of the rim are interconnected with secondary rim portions 16. Preferably, the equilateral sides are arcuately interconnected 17 as shown in FIG. 6; however, the equilateral sides may be lineally interconnected as illustrated in FIG. 5.

A plurality of spaced teeth 18 project from at least one side of the rim near the secondary rim portions. The teeth have driving surfaces 20 which are preferably both axially and radially aligned. Optionally, the teeth 18 may have axially aligned holes 21 which extend through the secondary rim portion. The holes are for receiving a fastening means in another embodiment of the invention which will later be described.

The hub of the sprocket wheel may be provided with means for attachment to a shaft. For example, the hub may have a polygonal shape hole 22 such as a hexagon to receive a hexagonal shaped shaft 24, or the hub of the wheel may be recessed 26 to receive a shaped collar that is mounted to a shaft. Of course, other means such as splines, pins, or the like may be used to define a shaft attachment means. The hub is optionally tapered 28 adjacent the driving surfaces 20 so that foreign debris may be easily directed from the vicinity when the sprocket is in use.

Referring to FIG. 3, two oppositely facing sprocket wheels 10 with teeth 18 projecting from only one side may be arranged oppositely facing each other on a shaft such as the hexagonal shaft 24. A reinforcement member 30 such as a steel disk may be interpositioned between the two sprockets. The rim of the reinforcement member does not extend beyond the rim of the sprockets. The reinforcement disk may be fixedly attached or removably attached to the shaft. It may include its own hub portion 32 such as for receiving the hexagonal shaft or the reinforcement may be permanently attached to the shaft such as by pinning or welding. The hub of the reinforcement may fit within the recess 26 of the sprocket wheel. The sprocket wheels and reinforcement are attached together with fasteners 34 such as nuts and bolts or rivets. Such fasteners not only secure the sprocket wheels together, but they also reinforce the teeth and define a means for transmitting torque from the reinforcement disk to the sprocket wheels.

Optionally, the sprocket wheel may have spaced teeth 36 which extend in lineal axial alignment from each side of the secondary rim portions as is shown in FIG. 4. Such an arrangement yields a structure that is similar to that as disclosed in FIG. 3 but without a reinforcement. While the teeth may be separately attached to the rim with individual fasteners, it is preferred that the sprocket wheel be integrally molded of materials such as high molecular weight polyethylene, nylon, or urethane.

In use, the sprocket wheel is attached to a rotatable shaft and a toothed belt 37 is engaged therewith. Such belts have typically two parallel rows of spaced teeth 38. The lugs are quite large to prevent belt movement without disengagement. The massiveness of the teeth 38 or exterior ribs 40 increases the bending stiffness of the juxtaposed belt which inhibits belt bending juxtaposed the teeth. In prior art sprockets, the belt is forced to bend around a circular rim which introduces hysteresis in the belt juxtaposed the belt teeth. Comparatively, the sprocket of the invention permits the belt to bend chordally so that that portion of the belt juxtaposed the belt teeth does not have to appreciably bend. This eliminates hysteresis in the belt which in turn promotes longer belt life. The preferably rounded secondary rim portion permits the thin flexible portion of the belt to bend in a smooth arc for reduced bending stresses. The lineal secondary rim portions 16 form a large angle with the sides 12 so that concentrated stresses are not introduced.

To exemplify the advantage of the sprocket of the invention, two belts of substantially the same length and construction were constructed. One belt was trained around 4.65" diameter sprockets of the invention while the other belt was trained around prior art 4.65" diameter sprockets having a circular rim. The belts were tensioned to 100 pounds. The belt trained around sprockets of the invention could be easily moved by hand whereas the belts using prior art sprockets were difficult to move. The average force required to move the belt on the sprockets of the invention was 7 pounds whereas belts around the prior art sprockets required an average of 15 pounds. When the belts were run, stress cracks occurred after 24 hours of operation in the belts trained around the prior art sprockets whereas stress cracks did not occur in the belt trained around sprockets of the invention after 400 hours of operation.

The foregoing detailed description is made for purpose of illustration only and it is not intended to limit the scope of the invention which is to be determined from the appended claims.

What is claimed is:

1. A sprocket wheel for a toothed belt, the sprocket wheel having an axis, hub, generally oppositely axially facing imperforate sides, and rim wherein the improvement comprises:
    a generally polygonal rim portion with substantially equilateral peripheral sides that are successively interconnected with peripheral secondary rim portions, and
    a first plurality of circumferentially spaced sprocket teeth attached to and extending from at least one axially facing side with one tooth extending from each secondary rim portion, the sprocket teeth extending substantially axially with respect to the wheel axis and wherein the sprocket teeth have generally radial sides that are substantially flat and extend from the secondary rim portions to a tapered hub and define generally axially extending driving surfaces coextensive of the radial sides, and wherein the sides of successive sprocket teeth, the imperforate side of the wheel, and the tapered hub define a belt tooth receiving cavity for engaging a belt tooth and directing foreign debris from the sprocket when in use.

2. The sprocket wheel as claimed in claim 1 which further comprises a second plurality of spaced sprocket teeth attached to and extending from an opposite axially facing side of the wheel at the secondary rim portions, the second plurality of sprocket teeth in extending axial and lineal alignment with the first plurality of sprocket teeth.

3. The sprocket wheel of claim 1 wherein the secondary rim portions are arcuate.

4. The sprocket wheel of claim 1 which further includes means for fastening the wheel in axial alignment to a second similar wheel.

5. A sprocket wheel for a toothed belt, the sprocket wheel having an axis, generally oppositely axially facing imperforate sides, and hub comprising:
    first and second oppositely facing co-axial halves with aligned generally polygonal rim portions with substantially equilateral peripheral sides successively interconnected with peripheral secondary rim portions, each rim portion having a flat side that faces each other and oppositely facing sides;
    a plurality of circumferentially spaced sprocket teeth extending axially from the oppositely facing sides of each half from the secondary rim portions, the sprocket teeth of the first and second halves substantially axially aligned with respect to the sprocket wheel axis and the sprocket teeth of the first and second halves lineally aligned with each other and wherein the sprocket teeth have generally radial sides that are substantially flat and extend from the secondary rim portions to a tapered hub wherein the sides of successive sprocket teeth, the imperforate sides of the wheel, and the tapered hub define a belt tooth receiving cavity for engaging a belt tooth and directing foreign debris from the sprocket when in use; and
    means for holding the halves together.

6. The sprocket wheel of claim 5 wherein each half and the sprocket teeth are integrally molded of a polymer.

7. The sprocket wheel of claim 6 wherein the holding means includes an axially aligned fastener disposed through at least one sprocket tooth of each half.

8. The sprocket of claim 7 wherein a substantially rigid disk is disposed between the first and second halves.

9. The sprocket of claim 8 wherein the disk includes means for mounting to a shaft.

10. In a sprocket wheel for a toothed belt having two rows of belt teeth, the sprocket wheel having an axis, generally oppositely axially facing imperforate sides, a hub, a rim, and axially oriented sprocket teeth extending in alignment from each imperforate side, the improvement comprising:
    a generally polygonal rim portion with substantially equilateral peripheral sides that are successively interconnected with arcuate secondary rim portions, the sprocket teeth extending from the secondary rim portions and having generally radial sides that are substantially flat and extend from the secondary rim portions to a tapered hub to define generally axially extending surfaces coextensive of the radial sides wherein the sides of successive sprocket teeth, the imperforate sides of the wheel, and the tapered hub defines a belt tooth receiving cavity for engaging a belt tooth and directing foreign debris from the sprocket when in use.

* * * * *